J. M. MALLORY.
SWITCH OPERATING DEVICE.
APPLICATION FILED OCT. 20, 1916.
1,231,403.
Patented June 26, 1917.
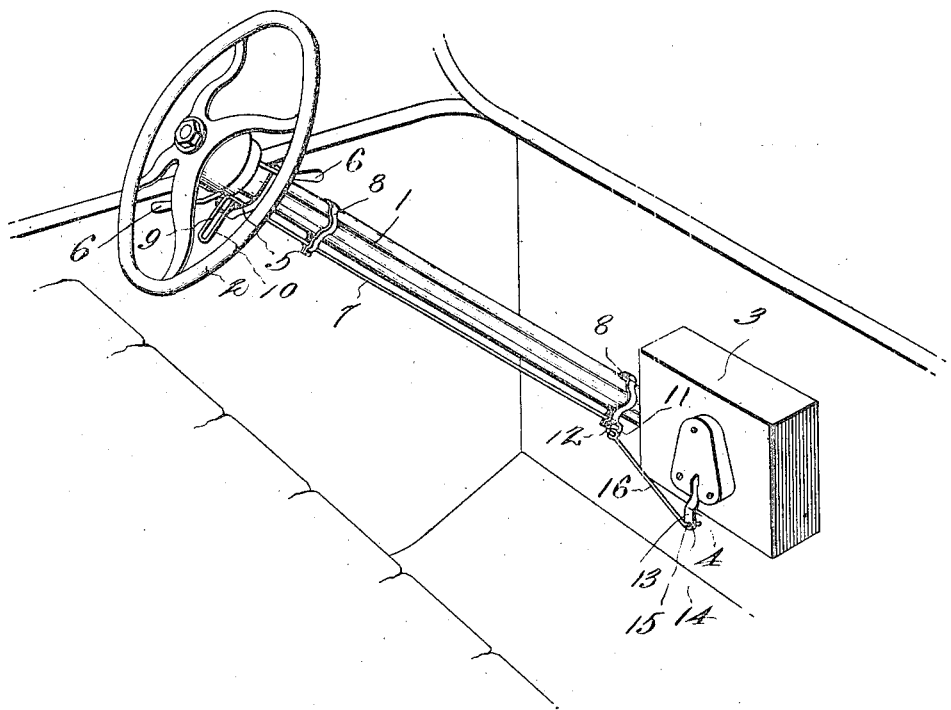
Witness
M. May Duvall.
J. J. McCarthy
Inventor
J. M. Mallory,
By Victor J. Evans
Attorney

UNITED STATES PATENT OFFICE.

JESSE M. MALLORY, OF NEW GENEVA, PENNSYLVANIA.

SWITCH-OPERATING DEVICE.

1,231,403.

Specification of Letters Patent. Patented June 26, 1917.

Application filed October 20, 1916. Serial No. 126,766.

*To all whom it may concern:*

Be it known that I, JESSE M. MALLORY, a citizen of the United States, residing at New Geneva, in the county of Fayette and State of Pennsylvania, have invented new and useful Improvements in Switch-Operating Devices, of which the following is a specification.

This invention relates to improvements in switch operating devices and has particular application to a device whereby the ignition switch of the internal combustion engine of a motor vehicle may be controlled from the steering wheel of the vehicle.

In carrying out the present invention, it is my purpose to provide an operating device of the class described whereby the ignition switch may be manipulated from the steering wheel of the motor vehicle, thereby eliminating the necessity of reaching from the seat to the dash board, and enabling the driver to conveniently break the ignition circuit when traveling down grade.

With the above and other objects in view, the invention consists in the construction, combination and arrangement of parts, hereinafter set forth and falling within the scope of the claims.

In the accompanying drawings:—

The figure is a perspective view showing my improved operating device installed in a motor vehicle.

Referring now to the drawings in detail, 1 designates a steering column of the motor vehicle equipped at its upper end with a steering wheel 2, while 3 indicates a switch box arranged upon the dashboard of the vehicle, and equipped with a key 4 whereby the switch may be opened and closed. Arranged beneath the steering wheel 2 and movable over a toothed sector 5 secured to the sleeve of the steering column are the gas and spark controlling levers 6 arranged at diametrically opposite sides of the column, as is well known.

In accordance with my present invention, I employ a rod 7 extending longitudinally of the steering column 1 and secured thereto by means of clamping clamps 8 encircling the steering column and suitably connected to the rod to form bearings in which the rod may be rotated. The upper end of the rod is bent at right angles to itself as at 9, and then bent upon itself as at 10, and the portion 10 engages the sector 5 at a point between the gas and spark control levers 6, so that the rod 7 may be held in the desired adjusted position. The lower end of the rod is bent outwardly at right angles to itself as at 11 and formed on the outer end of the bent portion 11 is an upwardly projecting pin 12. The switch key 4 is equipped with a handle 13, and formed in the handle 13 is an opening 14 in which is engaged a hook 15 on one end of a link rod 16. The other end of the link rod 16 is formed with an eye 17 that engages the pin 12 on the lower end of the rod.

In practice, when it is desired to open or close the switch, the operator of the vehicle may rotate the rod 7 by means of the bent portions 9 and 10 of the lever, and in the movement of the rod 7, motion is transmitted through the link rod 16 to the switch key.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:—

1. An operating device for the ignition switches of the internal combustion engines of motor vehicles, comprising a rod extending longitudinally of the steering column and having the upper end bent at right angles to itself and then bent upon itself to form a handle for the rod and to engage the toothed sector on the steering column whereby the rod may be held against accidental movement, and a connection between the lower end of said rod and switch key.

2. An operating device for the ignition switches of the internal combustion engines of motor vehicles, comprising a rod extending longitudinally of the steering column and having the upper end bent at right angles to itself and then bent upon itself to form a handle for the rod and to engage the toothed sector on the steering column whereby the rod may be held against accidental movement, the lower end of said rod being outturned and formed with an upwardly projecting pin, and a link rod having one end connected to the switch key and the other end formed with an eye to receive said pin.

In testimony whereof I affix my signature.

JESSE M. MALLORY.